United States Patent Office 3,123,342
Patented Mar. 3, 1964

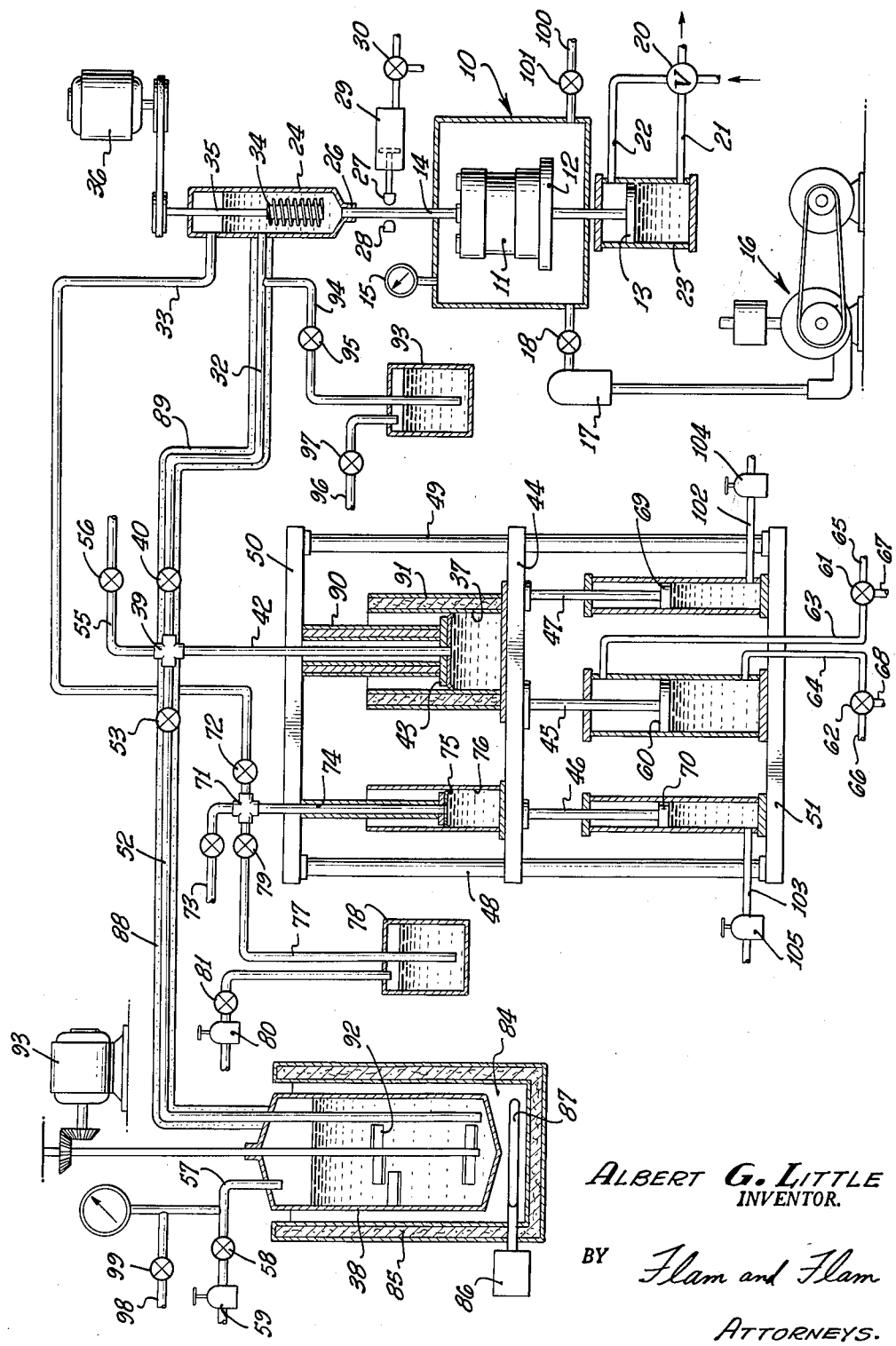

3,123,342
PLASTIC MIXING APPARATUS
Albert G. Little, Milford, Conn., assignor, by mesne assignments, to The Emerson Electric Manufacturing Company, St. Louis, Mo., a corporation of Missouri
Filed Feb. 8, 1960, Ser. No. 7,317
3 Claims. (Cl. 259—23)

This invention relates to plastic molding operations and specifically to the supply of constituent materials to a molding chamber.

The adherent characteristics of epoxy resins are well known. Necessarily such resins are conditioned for hardening only immediately in advance of actual injection into a mold. There is no other known practical way for handling this material.

The epoxy material is conditioned by a hardener at a stage immediately in advance of the molding step. A mixer is usually provided for bringing about intimate intermixture. Obviously the mixer is subject to the danger of being clogged by hardening of the resin mixture. The time between successive castings must be held to a predetermined maximum in order to avoid shut-down for cleaning the mixer. Sometimes this is not always possible. Yet it would be wasteful continuously to pass material through a mixer when its use is actually not required.

Accordingly, one of the primary objects of this invention is to avoid the necessity of dismantling the mixer for cleaning despite the fact that operation of a molding process is temporarily or otherwise interrupted for a time greater than that in which the hardener acts. To implement this process use is made of a purging fluid, together with suitable valving arrangements whereby actual removal of the mixer for cleaning is obviated.

Another object of this invention is to provide improved structures for handling material such as epoxy resins, and that are capable of ready cleaning.

Another object of this invention is to provide improved process elements whereby the epoxy material and a hardener may be provided expeditiously in relatively metered rates.

Another object of this invention is to provide a novel valve structure whereby the flow of the epoxy material with its hardener may readily be controlled in an expeditious and simple manner, and such that the material does not contact any valve parts. Cleaning is thus no problem. For this purpose, use is made of a simple hose structure which at one end detachably cooperates with the mixer and at its other end detachably and separably engages the mold proper. This rubber hose element furthermore forms a means whereby connection is established to the mold proper in a vacuum chamber without requiring complicated extra fittings for establishing a seal.

Another object of this invention is to provide suitable provisions for advance treatment of the resin and hardener materials.

Still another object of this invention is to provide suitable intermediate and ultimate storage facilities for the constituent materials whereby the materials can be expeditiously handled, treated and moved.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings, the single figure is a diagrammatic representation of apparatus for use in connection with an epoxy molding process.

At the lower right-hand side of the drawings, there is illustrated a molding chamber 10 in which a mold 11 is accommodated. The mold 11 rests upon a platform 12 that in turn is supported upon a hydraulic piston 13. Accordingly, the mold 11 can be raised and lowered toward and away from an injection nozzle formed at the end of a flexible hose 14. Mold 11 may, for example, be adapted to encapsulate the stator of a submersible electric motor.

The chamber 10 may be subjected to a vacuum, indicated by the gauge 15, by the aid of a vacuum pump 16. Associated with the vacuum pump 16 in circuit between it and the chamber 10 is a filter 17 and a valve 18 operated by an electromagnet or other remotely controlled device.

The raising and lowering of the platform 12 is controlled by the aid of a four-way valve 20 operating in connection with motor conduits 21 and 22 to opposite ends of a cylinder in which the piston 13 works.

The flexible hose 14 connects with a mixer 24 at which the epoxy resin material and the hardener are first placed in contact. The hose 14 is telescopically received within a protuberance 26 formed at the lower end of the mixer body 24. Accordingly, the tube 14 forms an outlet from the mixer. Furthermore, the hose 14 at its other end projects bodily through the wall forming the molding chamber 10 and with sufficient fit to ensure an adequate air seal. The very end of the hose 14 may cooperate with a sprue hole in the parts forming the mold 11.

In order to control passage of the epoxy material into the mold 11, a valve structure is provided. The valve in this instance is in the form of a simple hose clamp engageable with the hose 14 intermediate its length. Bars 27 and 28 on opposite sides of the hose are movable towards each other releasably to pinch the hose 14. Accordingly, flow through the hose 14 is controlled. Relative movement of the bars 27 and 28 is controlled by a hydraulic cylinder 29 in turn controlled by an electromagnetic or other suitable valve 30.

The valve arrangement facilitates maintenance of the parts. Thus, the hose 14 is a simple part that is readily detachable from the mixer 24 and from the wall of the mixing chamber 10. Thus, if the epoxy material chances to harden within the hose 14 for any cause, the hose is replaced without significant loss. The only part of the valve structure that contacts the epoxy material is the hose itself.

The mixer body 24 has two inlets cooperable respectively with a first conduit 32 for the resin material, and a second conduit 33 for the hardening material. The inlets at the ends of the conduits 32 and 33 are separate, distinct and substantially spaced so that when the interior of the body 24 is cleaned the constituents gathered at the conduits 32 and 33 are out of contact.

A rotary chopper or mixing member 34 is accommodated in the mixer body 24 and is suspended at the end of a shaft 35 that is power rotated by the aid of a motor 36. The mixing member 34 intimately intermixes constituent materials whereby the epoxy resin is conditioned for hardening.

The epoxy material is fed to the mixer body 24 via the conduit 32 by the aid of a hydraulic cylinder 37. The hydraulic cylinder 37 in turn is supplied from a storage tank 38. The conduit 32 connects with the cylinder 37 by the aid of a four-way fitting 39, there being an electromagnetic or other suitable valve 40 interposed in the conduit 32 for controlling the flow of epoxy to mixer 24. A conduit 42 cooperating with another branch of the four-way fitting 39, serves to establish communication therefrom to the cylinder 37. The conduit 42 extends through a piston 43 and is in communication with the interior of the cylinder in which the piston works.

The cylinder itself moves relative to the piston 43 which is stationary. For this purpose, cylinder 37 is supported upon a movable platform 44. The platform 44 is movable axially of the cylinder 37, and is guided by guide posts 48 and 49 that extend between upper and lower supports 50 and 51. For moving and supporting the platform, pneumatic pistons 60, 69 and 70 are provided that work in cylinders supported on the lower support 51. Connecting struts 45, 46 and 47 extend from the pistons to the platform 44. The piston 60 serves to move the platform 44 whereas pistons 69 and 70 serve to support its weight.

The storage tank 38 communicates with the cylinder 37 by the aid of a conduit 52. The conduit 52 at one end projects into the bottom of the storage tank 38 and at its other end cooperates with the third branch of the four-way fitting 39. An electromagnetic or other suitable valve 53 is interposed in the conduit 52. A fourth conduit 55 cooperating with the fitting 39 selectively vents the lines for bleeding air from the system. A valve 56 is provided for this purpose.

Material is drawn into the cylinder 37 from the tank 38 when the valve 53 from the tank 38 is opened, the valves 40 to the mixer and 56 to the vent closed, and when the table or platform 44 is lowered. Air pressure to the storage tank 38 moves the fluid. For this purpose, a conduit 57 opening into the top of the storage tank 38 communicates with a source of air pressure via valve 58 and a regulator 59.

Lowering or raising of the platform 44 is accomplished suitably by controlling the admission of air optionally on one side of the main piston 60, and exhausting air from the other side. This is done by the aid of three-way valves 61 and 62 cooperable with conduits 63 and 64 to the upper and lower ends of the cylinder in which the piston 60 is accommodated. The three-way valves 61 and 62 are adapted selectively to place the corresponding conduits in communication with a source of pressurized air as at conduits 65 and 66 or to exhaust at conduits 67 and 68.

Since the pistons 69 and 70 serve merely to counter-balance the weight of the platform or table 44 and the load placed upon the platform or table, the spaces beneath the piston 69 and 70 are pressurized to an extent adequate for that purpose. Conduits 102 and 103 communicate with the air supply through suitable regulators 104 and 105 that may be adjusted in an appropriate manner.

In order to pass the resin material from the cylinder 37 to the mixer 24, the platform 44 is raised after the valve 53 from the storage tank is closed and the valve 40 opened. But before that is done, at the start of any run air is bled from the system by the aid of the valve 56.

The hardener material is similarly handled. Thus, the conduit 33 communicates with a four-way fitting 71 via a valve 72. A valve controlled vent 73 also extends from the fitting 71. A conduit 74 extending from still another branch of the fitting communicates with a piston 75, accommodated in a cylinder 76, in turn resting upon the platform 44. A conduit 77 extends from the final branch of the fitting 71 at one end to the bottom of a hardener storage tank 78 at its other end. A valve 79 is interposed in the conduit 77. Air for moving the hardener material is admitted into the hardener storage tank 78 via a regulator 80 and valve 81.

Material is thus simultaneously admitted into both the cylinders 37 and 76 and simultaneously expressed. The relative quantities of hardener and resin admitted into the mixer chamber 24 is controlled by the respective diameters of the pistons 43 and 75.

The resin material requires, by virtue of its nature, that it be heated during handling in order to ensure appropriate fluid characteristics and appropriate interaction with the hardener material. For this purpose, the storage tank 38 is heated by an oil bath 84 accommodated in an insulated container 85. An electric heater 86 has coils 87 extending into the bottom of the oil bath 84 to maintain a suitable temperature.

The conduits 52 and 32 are preferably provided with insulation as at 88 and 89 to ensure against undue heat loss. Furthermore, hot oil jackets may be provided about the conduit 42 and about the cylinder 37 to keep the resin suitably conditioned. A jacket 90 is supported between the piston 43 and the upper support 50, and a cylindrical shell 91 surrounds the cylinder 37 to provide an oil jacket.

A paddle-wheel mixer 92 projecting into the reservoir tank 38 for the resin is run continuously in order to maintain appropriate homogeneity of the material. A motor 93 is illustrated for purposes of driving the mixer 92.

In operation, resin and hardener from the tanks 38 and 78 are introduced respectively into the cylinders 37 and 76 by suitable operation of the valves previously described. The resin tank 38 is then deaerated after the cylinder 37 is filled by connecting the conduit 58 to a vacuum source as by the aid of a conduit 98 controlled by a valve 99.

Preparatory to making the first casting of a run, the mixer 24 and the hose 14 are filled with material, the motor 36 being run at all times, at least at low speed.

The mold 11, ready for injection, is placed in the vacuum chamber 10 and in position to receive the suitably treated or conditioned epoxy material from the mixer 24. The vacuum pump 16 is started. The valves 62 and 61 are suitably controlled to cause the platform 44 to be raised, the motor 36 is operated at high speed, and the valve 27—28 is opened. When a suitable quantity of material has entered the mold 11, the valve 27—28 is closed, the platform 44 is held in position and the motor 36 is operated at low speed. The vacuum in the mold chamber 10 is relieved by closing the valve 18 and opening a vent 100 controlled by a valve 101. The mold 11 is moved downwardly by the piston 23, and another mold is placed on the table 12.

The operation can then be repeated for successive moldings.

If the time between successive castings exceeds a certain critical time, there is danger of the material hardening in the mixer 24. If this occurs the mixer body 24 must be cleaned. But to avoid dismantling the mixer body 24 and the hose 14 are left in place and flushed with solvent. This solvent is contained in a tank 93 capable of communication with the mixer 24 by the aid of a transverse connection with the conduit 32. A conduit 94 establishes connection between the resin conduit 32 and the bottom of the solvent tank 93, there being a valve 95 interposed in the conduit 94 for purposes of control. For motivating flow of solvent in the tank 93, the tank 93 is pressurized by an air source. For this purpose, a conduit 96 to the source is provided in which a valve 97 is interposed.

When cleaning is desired the valve structure 27—28 is opened and a container is placed under the hose 14 to receive the solvent and other material flushed from the mixer. The valves 97 and 95 are then opened and the chopper or rotary member 34 is rotated to assist the purging operation. When the mixer 24 is thoroughly cleaned, the inlets into the mixer 24 for the hardener material and the resin are substantially isolated from each other. This operation is also done at the end of a day's run or the like.

At the end of a day's run, the cylinders 37 and 76 should be cleaned. For this purpose, the table or platform 44 may be moved downwardly a distance sufficient to withdraw pistons 43 and 75 from the corresponding cylinders. This may be done, for example, by removal of a stop (not shown) operating in conjunction with the platform or table 44. When the pistons 43 and 75 are so withdrawn, suitable access is provided for hand cleaning without requiring actual disassembly of the parts.

The inventor claims:

1. In an intermediate storage device cooperable with a mixing chamber and a storage tank for use in the molding of plastic material or the like: a horizontal platform; means supporting the platform for vertical movement; a pair of cylinders of different cross-sectional areas supported on the platform and having openings at their upper ends; pistons for the cylinders and supported independently of and above the platform; conduit means connected to the respective pistons for communication with the cylinders via the pistons; means forming a mixing chamber forming terminal connections for said conduit means; and means for vertically moving the platform to cause relatively metered flow of material from the cylinders in accordance with their respective sizes.

2. In apparatus for use in molding plastic material comprising constituents mixed proximately in advance of molding: a pair of reservoir tanks for constituent materials; a pair of intermediate storage cylinders for constituent materials; means forming a mixing chamber; a movable horizontal platform supporting the cylinders; means forming a pair of inlets into said chamber; a pair of conduit means for respectively connecting an inlet, a reservoir tank and a storage cylinder; selectively operable valve means for each conduit means for placing the corresponding intermediate storage means in exclusive communication with the corresponding reservoir tank or the corresponding inlet; and means for selectively vertically positioning the platform for causing the cylinders to draw material from the corresponding reservoir tanks or to pass material to said mixer inlets.

3. The combination as set forth in claim 2, together with vents for the intermediate storage means, and valves for closing and opening the vents.

References Cited in the file of this patent

UNITED STATES PATENTS

| | | |
|---|---|---|
| 2,338 | Wightman | Nov. 10, 1841 |
| 1,974,663 | May | Sept. 25, 1934 |
| 1,990,634 | Brown et al. | Feb. 12, 1935 |
| 2,047,414 | Henery et al. | July 14, 1936 |
| 2,109,331 | Carnell | Feb. 22, 1938 |
| 2,287,360 | Sappington | June 23, 1942 |
| 2,801,083 | Ballassa | July 30, 1957 |
| 2,802,648 | Christensen et al. | Aug. 13, 1957 |
| 2,831,509 | Weingart et al. | Apr. 22, 1958 |
| 2,847,196 | Franklin et al. | Aug. 12, 1958 |
| 2,859,017 | Trumbull et al. | Nov. 4, 1958 |
| 2,868,518 | Carby et al. | Jan. 13, 1959 |